United States Patent Office 2,960,544
Patented Nov. 15, 1960

2,960,544
PROCESS FOR PREPARING DI-ALKALI METAL AROMATIC HYDROCARBONS AND PRODUCTS THEREFROM

Irving L. Mador and Theodore S. Soddy, Cincinnati, Ohio, assignors to National Distillers and Chemical Corporation, New York, N.Y., a corporation of Virginia No Drawing. Filed May 12, 1958, Ser. No. 734,390

12 Claims. (Cl. 260—665)

This invention relates broadly to a process for preparation of alkali metal adducts of certain aromatic hydrocarbons and, more particularly, to a method for preparing alkali metal derivatives, such as potassium derivatives, of benzene and alkyl-substituted benzenes.

It is an object of this invention to provide a method carried out under selected reaction conditions whereby an alkali metal is added to benzene and alkyl-substituted benzenes to provide the corresponding metallo derivative of dihydrobenzene and alkyl-substituted dihydrobenzenes and which metal adducts can be subjected to further reactions to produce highly valuable and useful derivatives.

It is a further object of this invention to provide a process for preparation of alkali metal adducts of benzene and alkyl-substituted benzenes, in which the desired adduct-forming reaction is effected rapidly and to a substantial extent.

Still another object of this invention is the provision of a method for preparation of alkali metal adducts of dihydrobenzene and alkyl-substituted dihydrobenzenes, and conversion thereof to salts of dihydroaromatic dicarboxylic acids, followed by liberation of the free acids from their salts with a specific object being the ultimate production of terephthalic acid and cyclohexanediacids by dehydrogenation or hydrogenation reactions, respectively.

A still further object is the preparation of glycols by a method starting with reaction of an alkali metal with benzene and alkyl-substituted benzenes to prepare alkali metal adducts of dihydrobenzene and of alkyl-substituted dihydrobenzenes and conversion thereof, by reaction with epoxy compounds, to glycols.

A further object is to provide a method for preparation of alkali metal adducts of benzene and alkyl-substituted benzenes which undergo Grignard reactions with Grignard type reactants to provide highly valuable and useful derivatives.

The present invention is based on the discovery that certain alkali metal adducts of dihydrobenzene and alkyl-substituted dihydrobenzene can be prepared by reaction of an alkali metal with benzene or alkyl-substituted benzene under defined conditions of temperature and certain reaction mediums whereby an alkali metal adds to the double bond system of benzene and alkyl-substituted benzenes. That benzene and alkyl-substituted benzenes can be effectively reacted to provide such a result is clearly novel and unexpected as is apparent from the following remarks.

It is known that, under certain selected reaction conditions, alkali metals will add to condensed ring systems such as naphthalene, anthracene, etc. to produce alkali metal adducts and that alkali metals will add to noncondensed polyaryls such as terphenyls, quaterphenyls, etc. However insofar as we are aware, the simple ring systems such as benzene, toluene, the xylenes, ethylbenzenes and related members have been considered inert to addition reactions with alkali metals and, hence, such benzenes have been considered for and used as inert carrier mediums for preparing finely divided dispersions of the alkali metals for use in reaction for adding sodium to condensed ring systems. Substitution reactions are known wherein an aliphatic derivative of an alkali metal, such as amylsodium or amylpotassium will metalate benzene to replace a hydrogen atom to produce phenylsodium or phenylpotassium or disodio- or dipotassiobenzene, but in such substitution reactions the aromatic conjugation is left intact and dihydro derivatives are not formed. Thus, in the case of toluene, the substitution reaction with amylsodium takes place on the alkyl group initially so that benzylmetal compounds are formed. Moreover, it is also known that benzene may be reduced to dihydrobenzene by reaction with sodium and an alcohol in liquid ammonia but, in such a reaction, the alcohol is essential for reaction with the sodium whereby to produce hydrogen that undergoes addition to the benzene.

In the present process, the desired adduct formation is effected by reacting benzene, or an alkyl-substituted benzene with certain alkali metals in certain reaction media at a temperature of below about —10° C. and, preferably, substantially below —10° C. For use in such a reaction and, in addition to benzene itself, homologs thereof such as alkyl-substituted benzenes in which the alkyl-substituent contains from one to six carbon atoms may be used with specific examples being toluene, the xylenes, ethylbenzene, durene, etc.

Although temperatures of below about —10° C. may be used, substantially lower temperatures are preferred, such as below about —20° C. and even substantially lower as the still lower temperatures are more favorable to the desired reaction. Thus, temperature as low as —100° C. are particularly suitable with a highly satisfactory range being from about —20° C. to about —75° C.

The alkali metal employed is preferably potassium although other alkali metals such as rubidium and cesium may be used. Thus, suitable for practice are alkali metals such as potassium, rubidium, cesium and alloys of such metals with sodium, and the like.

The alkali metal can be used in a variety of forms. Thus, it may be used in finely dispersed form or as large pieces with the finely dispersed form being preferred as it expedites the desired reaction. When use is made of the alkali metal as a finely divided suspension, it can be suspended in a variety of inert media such as, for example, in isooctane, n-octane, kerosenes, mineral spirits, paraffins, other saturated paraffinic hydrocarbons, etc. Certain ethers may also be used as dispersion media provided they are not susceptible to extensive cleavage by the alkali metal, suitable examples thereof being ethers such as butyl ether and 1,2-dimethoxyethane, and others. Moreover, for the dispersing medium, use may also be made of the benzene or alkyl-substituted benzene of which the adduct formation, as is embodied herein, is desired. Thus, in carrying out the reaction embodied herein to form the adduct of benzene or alkyl-substituted benzene, the alkali metal can be dispersed in benzene or an alkyl-substituted benzene and the resulting dispersion added to the reaction medium at the temperature conditions effective for forming the alkali metal adduct.

The reaction media most suitable for the process embodied herein comprise certain types of ethers and tertiary amines which also promote the alkali metal addition reaction. Such ethers include aliphatic mono ethers in which the ratio of the number of oxygen atoms to the number of carbon atoms is not less than 1:4, and which will not be cleaved during the reaction period to produce cleavage products which may consume appreciable amounts of the reaction products or function as negative catalysts. Examples include cyclic ethers such as tetrahydrofuran and dioxane and ethers containing a methoxy group such as dimethyl ether, methyl ethyl ether, methyl n-propyl ether, methyl isopropyl ether, and mixtures of these ethers. Certain aliphatic polyethers are also quite satisfactory. These include polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, and glycerol dimethyl ethyl ether. Materials such as N-methylmorpholine, trimethylamine and the like also may be used. The simple methyl monoethers, as dimethyl ether, and the polyethers of ethylene glycols, such as ethylene glycol dimethyl ether, are preferred.

The ethers should not contain any groups such as hydroxyl, carboxyl and the like which are distinctly reactive towards alkali metal. Although the ether may react in some reversible manner, it must not be subject to cleavage to give irreversible reaction products during the addition reaction as such cleavage action destroys the ether and introduces into the reacting system metallic alkoxides which, in turn, tend to prevent the addition reaction from taking place or destroy the addition product once formed.

Inert liquids can be employed in limited amounts in mixture with the aforesaid reaction media. In general, such inert liquids are introduced with the alkali metals and especially so when the alkali metal is used as a suspension. Moreover, the reaction mixture should be free of impurities such as water, alcohols, unsaturated compounds or other materials which would react with either the alkali metal reactant or the adducts formed in the reaction to produce by-products which would interfere with or prevent the desired addition reaction from taking place.

In carrying out the invention embodied herein, reaction between the alkali metal and benzene or an alkyl substituted benzene is substantially instantaneous, but, to insure substantial completion of reaction, a period of from about one-half to about four hours is normally allowed. However, factors such as temperature, alkali metal particle size and rate of agitation may necessitate variations in the time allowed for substantial completion of the reaction. Thus, whereas use of 1–2 micron particle size average dispersion may react substantially completely in about one-half hour or less at a temperature of −75° C., use of substantially larger particles, e.g., one-quarter inch pellets of an alkali metal may require a substantially longer time, e.g., four or more hours and in some cases up to twenty-four hours for substantial completion of reaction.

The reaction may be carried out in either batch-wise, semi-continuous or in a continuous fashion.

The desired reaction can be carried out using the reactant in substantially stoichiometric amounts or, either of the reactants in excess. Thus, when it is desired to substantially completely react the alkali metal, it is used in substantially stoichiometric or less amount. On the other hand when it is desired to substantially completely react the benzene reactant, the alkali metal is used in excess, as for example, in excess of 2 and up to about 2.2 g. atoms of alkali metal to one mole of the benzene or alkyl-substituted benzene.

However, the preferred aspect of this invention involves the use of an excess of the aromatic compound over the theoretical quantity required to form the dialkali metal derivative, e.g., use of a ratio of 2 gram atoms of the alkali metal to from more than one and up to about 8 moles of the aromatic compound.

The alkali metal adducts of dihydrobenzene and alkyl-substituted dihydrobenzenes prepared in accordance with this invention may be isolated as such but preferably, they are directly and immediately upon preparation subjected to further reactions to form valuable derivatives. For example, subsequent carbonation of the reaction mixture containing the products yields the salts of dihydroaromatic dicarboxylic acids which, in the case of benzene, is the dialkali metal salt of 1,4-dihydroterephthalic acid. The carbonation may be carried out by subjecting the adducts to contact with dry gaseous carbon dioxide, with solid carbon dioxide or by adding the adducts to a solution of $CO_2$ in an inert liquid. The temperature of carbonation should be held below −10° C. to avoid decomposition and formation of undesirable by-products. The salts obtained from such carbonation of the adducts will contain two more carbon atoms per molecule than the dialkali metal derivative of the dihydroaromatic compound from which they are produced. In the case where benzene and potassium are the starting reactants, there results by this method the selective production of 1,4-dipotassio-2,5-cyclohexadiene. Acidification and dehydrogenation of this material following carbonation results in production of terephthalic acid. It is also possible to hydrogenate the 1,4-dicarboxy-2,5-cyclohexadiene to obtain 1,4-dicarboxylcyclohexane. These acids are useful in preparation of polyesters, polyurethanes, polymeric plasticizers and synthetic polymers.

The adducts of benzene and alkyl-substituted benzenes produced by the method herein may also be reacted with epoxides, such as ethylene oxide, to produce glycols with a specific example thereof being bis-1,4-(2′-hydroxyethyl)-dihydrobenzene which, for example, can be hydrogenated and/or dehydrogenated to provide products useful in the preparation of polyesters, polyurethanes and the like.

The adducts of benzene and alkyl-substituted benzenes produced by the process of this invention may be further utilized in the preparation of diamines by reaction with a haloamine, such as chloramine, to prepare diamines useful as the amine component in the preparation of highly useful polyamides.

In addition to carbonation, the adducts of benzene and alkyl-substituted benzenes may be reacted with any of many other Grignard type reactants having carbonyl, thionyl, nitrile and halogen groups to form highly valuable products. Typical examples of such Grignard type reactants are oxygen, formaldehyde, acetaldehyde, acetone, acetonitrile, propionitrile, sulfur, sulfur dioxide, sulfur trioxide, thionyl chloride, chloromethyl ether, dimethyl sulfate, methyl chloride, ethyl chloride, chlorine and the like. Thus, the alkali metal adduct of benzene can be reacted in typical Grignard type reactions with sulfur to produce a dimercaptan, with sulfur dioxide to a disulfinic acid, with formaldehyde to a diol, with cyanogen chloride to a dinitrile, or the adducts may be used generally as Grignard type reactants to provide addition reactions with esters, anhydrides and nitriles. Still further, cyanogen and cyanogen chloride are suitable for reaction with the alkali metal adducts of benzene and alkyl-substituted benzenes to provide highly useful derivatives thereof.

The adducts produced by the method embodied herein by reaction of the alkali metal with benzene or an alkyl-substituted benzene may be used per se, or in combination with other catalysts, as polymerization catalysts for a variety of olefins such as ethylene, styrene, butadiene and similar materials.

In order to further describe the invention, several embodiments thereof are set forth hereinafter for purposes of illustration and not limitation.

*Example 1*

A 0.37 g. atom portion of finely dispersed potassium metal (particle size 1 to 38 microns, stabilized with 0.5% aluminum stearate) in 40 ml. of alkylate and 200 ml. of anhydrous 1,2-dimethoxyethane were introduced into a round-bottomed flask. The suspension was cooled to −72° C. and stirred for 1 hour whereupon a solution of 0.6 mole of benzene in 60 ml. of 1,2-dimethoxyethane was added. The reaction mixture was stirred at −76° C. for 3 hours, and then carbonated by passing carbon dioxide over its surface for 2 hours. The resulting carbonated mixture, when warmed to 0° C., was hydrolyzed with 50 ml. of a 1:3 water-dimethoxyethane mixture and, finally, was diluted with 100 ml. of water. The basic layer was washed with diethyl ether to produce a yellow-brown product which, on acidification with hydrochloric acid produced 10.5 g. of crude 1,4-dicarboxy-2,5-cyclohexadiene (M.P.>270° C.) in a yield of 54% based on the amount of potassium employed:

Upon analysis, the acid thus obtained gave the following values:

|  | 1,4-dicarboxy-2,5-cyclohexadiene | |
| --- | --- | --- |
|  | Found | Calculated for($C_8H_8O_4$) |
| Iodine No. | 321 | 308. |
| Carbon-Hydrogen | Carbon—57.16% | 57.14%. |
|  | Hydrogen—4.83% | 4.76%. |
| Neutralization Equivalent | 86.5 | 84. |

Example 2

A 0.44 g. atom portion of finely dispersed potassium metal in 70 ml. of mineral spirits and 100 ml. of anhydrous 1,2-dimethoxyethane were introduced into a round-bottomed flask and cooled to −70° C. At the end of 1 hour, 15.6 g. (0.2 mole) of benzene in 50 ml. of dimethoxyethane was added over a period of 20 minutes. The reaction mixture was then stirred at −75° C. for 2 hours, and carbonated by passing carbon dioxide gas over the surface of the reaction mixture for 1 hour.

The mixture was then hydrolyzed by adding dropwise a 50 ml. solution of 1:4 water-dimethoxyethane mixture, a 1:2 water-dimethoxyethane mixture, and, finally, 100 ml. of water. The basic extract was separated, treated with charcoal and filtered. On acidification of this extract with concentrated hydrochloric acid to a pH of 1, crude 1,4-dicarboxy-2,5-cyclohexadiene was obtained as a white amorphous powder in a yield of 18 g. (54% based on benzene) which darkened on heating over 270°, but did not melt.

The acid was esterified by a conventional esterification reaction with phosphorous pentachloride and methanol, such esterification being accomplished with simultaneous dehydrogenation to produce the dimethyl ester of terephthalic acid which melted at 144–145° C. (140–141° C. corr'n.), i.e., the literature value for the methyl ester of terephthalic acid. A mixed melting point of the ester thus produced with a known sample of the dimethyl ester of terephthalic acid showed no depression and the infrared spectra of both samples were identical.

Example 3

A potassium dispersion was prepared from 14 g. of potassium in a baffled flask by high speed stirring in a suspending media of mineral spirits (125 ml.) and dimethoxyethane (125 ml.). The dispersion was cooled to −70° C., 50 ml. of anhydrous benzene was added, and the mixture stirred at −74° C. for one hour. The reaction mixture was then carbonated with carbon dioxide and hydrolyzed in the manner described in Example 1 whereby there was produced 1,4-dicarboxy-2,5-cyclohexadiene in a 34% yield based on the potassium used.

Example 4

To a mixture of 16.2 g. of sodium-potassium (1:4) alloy and 250 ml. of anhydrous dimethoxyethane was added 50 ml. of anhydrous benzene at −100° C. The reaction mixture was permitted to rise to −78° C. and carbonation was effected by passing carbon dioxide over the surface of the reaction mixture for 35 minutes. By hydrolysis of the reaction mixture, separation of the resulting basic layer, and acidification to a pH of 1 with concentrated hydrochloric acid, 1,4-dicarboxy-2,5-cyclohexadiene was obtained.

Example 5

Into a 1000 ml. flask was introduced 5.7 g. (0.22 g. atom) of a potassium-sodium dispersion (1:4) and 100 ml. of dimethoxyethane. On cooling this suspension to −70° C., a blue color was formed. To this mixture was added dropwise 7.8 g. (0.1 mole) of benzene in 50 ml. of dimethoxyethane over a 30 minute period whereby a yellow complex salt was formed. After the yellow complex salt intermediate had precipitated, the reaction mixture was carbonated on solid carbon dioxide. After hydrolysis of the carbonation mixture, the basic extract was acidified to a pH of 1 whereupon 1,4-dicarboxy-2,5-cyclohexadiene was obtained.

Example 6

Into a 1000 ml. flask was introduced 8.6 g. (0.22 g. atom) of a potassium dispersion in 200 ml. of dimethoxyethane. In cooling the suspension to −70° C., a blue color was noted. Four grams (0.05 mole) of benzene was added dropwise in 50 ml. of dimethoxyethane. The color turned green, and 1,4-dipotassio-2,5-cyclohexadiene separated. Ethylene oxide (35.2 g., 0.8 mole) was passed over the reaction mixture by entrainment with argon. Red-brown and dark red color sequences were observed. The reaction mixture was hydrolyzed, and the ether layer separated and combined with two diethyl ether extracts (50 ml. each) of the water layer. The combined organic extracts were dried over anhydrous magnesium sulfate. The dried ether extract was concentrated, and the residue distilled to yield a yellow oil (B.P. 150–155° C. at 1 to 0.1 mm.), i.e., bis-1,4-(2'-hydroxyethyl)-2,5-cyclohexadiene which analyzed as follows:

Calc. for $C_{10}H_{16}O_2$; C, 70.43; H, 9.52. Found: C, 69.87; H, 9.28.

Example 7

Into a small flask was placed 5 g. of 1,4-dicarboxy-2,5-cyclohexadiene and 1.2 g. of sulfur. This mixture was heated to 250–275° C. for 1 hour. The odor of hydrogen sulfide was quite distinct. The residue which remained on cooling the flask was extracted with caustic; treated with charcoal, and filtered. The filtrate was acidified to yield 2.5 g. (50%) of terephthalic acid.

Example 8

Into a dried, nitrogen-flushed gas bottle was introduced 20 ml. of reduced platinum on carbon and 5.1 g. (0.03 mole) of 1,4-dicarboxy-2,5-cyclohexadiene which was dissolved in 50 ml. of 10% sodium hydroxide. This mixture was attached to a rocking hydrogenation apparatus for 15 hours at 48 p.s.i.g. of hydrogen. The filtered solution was acidified and the crude acid crystallized from water to give 2.5 g. of 1,4-dicarboxycyclohexane melting at 160–161° C.

Example 9

A mixture of 2 g. of a potassium dispersion in mineral spirits and 20 mls. of dimethyl ether under an argon atmosphere was cooled to −75° C. and a yellow-brown color developed. Upon addition of benzene, the surface of the metal turned yellow as in Example 5 showing the formation of the potassium-benzene adduct.

While there are above disclosed but a limited number of embodiments of the process of the invention herein presented, it is possible to produce still other embodiments without departing from the inventive concept herein disclosed, and it is desired therefore that only such

What is claimed is:

1. A process which comprises reacting an alkali metal from the group consisting of potassium, rubidium and cesium with an aromatic hydrocarbon from the group consisting of benzene and alkyl-substituted benzenes at below about −10° C. in an inert liquid reaction medium to form the alkali metal adduct of said aromatic hydrocarbon.

2. A process, as defined in claim 1, wherein the alkali metal is potassium.

3. A process, as defined in claim 1, wherein the aromatic hydrocarbon is benzene.

4. A process, as defined in claim 1, wherein the reaction medium is an ether from the group consisting of aliphatic monoethers having an oxygen to carbon ratio of not less than 1:4 and polyethers derived from an aliphatic polyhydric alcohol having all hydroxyl hydrogen atoms replaced by alkyl groups, and mixtures of said ethers.

5. A process, as defined in claim 1, wherein the reaction medium is 1,2-dimethoxyethane.

6. A process, as defined in claim 1, wherein the reaction is carried out at from about −20° C. to about −75° C.

7. A process, as defined in claim 1, wherein the alkali metal is finely divided.

8. A process, as defined in claim 1, wherein the reaction mixture comprising the alkali metal adduct of the aromatic hydrocarbon is reacted with a Grignard reactant.

9. A process which comprises reacting benzene with potassium at below about −10° C. in a reaction medium comprising 1,2-dimethoxyethane to form a potassium adduct of benzene.

10. A di-alkali metal addition product of benzene.

11. A dipotassio adduct of benzene.

12. 1,4-dipotassio-2,5-cyclohexadiene.

References Cited in the file of this patent

UNITED STATES PATENTS

| | | |
|---|---|---|
| 2,019,832 | Scott | Nov. 5, 1935 |
| 2,548,803 | Little | Apr. 10, 1951 |
| 2,750,411 | Fisher et al. | June 12, 1956 |
| 2,765,334 | Stinson et al. | Oct. 2, 1956 |
| 2,788,377 | Barber | Apr. 9, 1957 |
| 2,795,624 | Nobis et al. | June 11, 1957 |
| 2,812,363 | Mills | Nov. 5, 1957 |
| 2,816,935 | Watson et al. | Dec. 17, 1957 |
| 2,823,238 | Beets et al. | Feb. 11, 1958 |
| 2,852,568 | Schmerling | Sept. 16, 1958 |
| 2,868,842 | Closson et al. | Jan. 13, 1959 |